US009587556B2

(12) United States Patent
Wang et al.

(10) Patent No.: US 9,587,556 B2
(45) Date of Patent: Mar. 7, 2017

(54) WASTEGATE CONTROL

(71) Applicant: Ford Global Technologies, LLC, Dearborn, MI (US)

(72) Inventors: Yan Wang, Ann Arbor, MI (US); Amey Y. Karnik, Canton, MI (US); Vladimir V. Kokotovic, Bloomfield Hills, MI (US); Gregory Patrick McConville, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 55 days.

(21) Appl. No.: 14/327,357

(22) Filed: Jul. 9, 2014

(65) Prior Publication Data

US 2016/0010541 A1    Jan. 14, 2016

(51) Int. Cl.
| | | |
|---|---|---|
| F02D 23/00 | (2006.01) | |
| G06F 19/00 | (2011.01) | |
| F02B 37/18 | (2006.01) | |
| F02D 41/20 | (2006.01) | |
| F02D 41/00 | (2006.01) | |
| F02D 41/14 | (2006.01) | |
| F01N 5/04 | (2006.01) | |
| F02B 33/40 | (2006.01) | |
| F02B 39/10 | (2006.01) | |

(52) U.S. Cl.
CPC ........ F02B 37/186 (2013.01); F02D 41/0007 (2013.01); F02D 41/20 (2013.01); *F01N 5/04* (2013.01); *F02B 33/40* (2013.01); *F02B 39/10* (2013.01); *F02D 41/1448* (2013.01); *F02D 2041/2027* (2013.01); *F02D 2250/16* (2013.01); *Y02T 10/144* (2013.01)

(58) Field of Classification Search
CPC ...... F02B 37/186; F02B 37/183; F02B 37/18; F02D 41/0007
USPC .......................................................... 60/602
See application file for complete search history.

(56) References Cited

U.S. PATENT DOCUMENTS

| | | | | |
|---|---|---|---|---|
| 4,424,675 A | * | 1/1984 | Ojima | F02B 37/186 60/602 |
| 5,673,559 A | * | 10/1997 | Benson | F02B 37/183 60/602 |
| 2007/0163531 A1 | * | 7/2007 | Lewis | F02D 13/0207 123/179.4 |
| 2008/0066723 A1 | * | 3/2008 | Eiraku | F02B 39/16 123/564 |
| 2011/0000209 A1 | | 1/2011 | Boening et al. | |
| 2011/0023481 A1 | | 2/2011 | Baeuerle | |
| 2011/0314807 A1 | * | 12/2011 | Karnik | F02B 37/183 60/602 |

(Continued)

FOREIGN PATENT DOCUMENTS

JP    WO 2006038730 A1 *  4/2006 ............. F02B 37/18

*Primary Examiner* — Nicholas J Weiss
*Assistant Examiner* — Ngoc T Nguyen
(74) *Attorney, Agent, or Firm* — Julia Voutyras; John D. Russell; B. Anna McCoy

(57) ABSTRACT

Various methods for determining a holding current based on a pressure differential across a wastegate valve are provided. In one example, a method of operating a wastegate comprises determining a holding current with which to hold a wastegate valve at a desired position, the holding current determined based on a pressure differential across the wastegate valve.

15 Claims, 6 Drawing Sheets

(56) References Cited

U.S. PATENT DOCUMENTS

| | | | |
|---|---|---|---|
| 2014/0360178 A1* | 12/2014 | Wang | F02B 37/183 60/602 |
| 2015/0128586 A1* | 5/2015 | Panciroli | F02D 41/1401 60/602 |
| 2015/0240731 A1* | 8/2015 | Yokono | F02B 37/183 60/611 |

* cited by examiner

WASTEGATE CONTROL

FIELD

The field of the disclosure relates to control of a wastegate in a turbocharger.

BACKGROUND AND SUMMARY

Some internal combustion engines utilize a compression device such as a turbocharger to increase engine torque/power output density. In one example, a turbocharger may include a compressor and a turbine connected by a drive shaft, where the turbine is coupled to an exhaust manifold side of an engine and the compressor is coupled to an intake manifold side of the engine. In this way, the exhaust-driven turbine supplies energy to the compressor to increase the pressure (e.g. boost, or boost pressure) in the intake manifold and to increase the flow of air into the engine. The boost may be controlled by adjusting the amount of gas reaching the turbine, for example with a wastegate. An actuator may be operatively coupled via a linkage to a wastegate valve and driven to position the wastegate valve anywhere between a fully open position and a fully closed position (e.g., at a valve seat) to achieve the desired boost based on operating conditions. The actuator may be an electric actuator such as an electric motor, for example.

Electric wastegate actuators are designed to be able to place a wastegate valve at the fully closed position so that maximum boost may be delivered to an engine when desired. As exhaust pressure acts against the wastegate valve, continuous application of current to the wastegate actuator is required to provide an adequate force opposing the exhaust pressure and to maintain the wastegate valve at the fully closed position. The current required to maintain the wastegate valve at the fully closed position will vary throughout the course of operation as the exhaust pressure acting against the valve, and the pressure differential across the valve, varies as well.

In some approaches, a DC current is applied to the electric wastegate actuator to maintain the wastegate valve at the fully closed position when placement at the fully closed position is desired. The DC current is the current sufficient to maintain the wastegate valve at the fully closed position with the maximum potential exhaust pressure acting against the valve. In other words, the DC current is selected based on worst-case operating conditions. As such, the DC current often exceeds the current that is merely sufficient to maintain placement at the fully closed position, as the instant exhaust pressure acting against the valve is frequently less than the maximum potential exhaust pressure.

The inventors herein have recognized several issues with the approach identified above. Because the DC current frequently exceeds that which would be sufficient to maintain the wastegate valve fully closed, the wastegate actuator consumes an excessive amount of power. Further, the use of excessive current to hold the wastegate valve fully closed imposes excessive force on the wastegate valve and potentially other parts of the wastegate assembly (e.g., a linkage coupling an output end of the wastegate actuator to the valve), in turn imposing a high degree of mechanical stress thereon. Still further, excessive current consumption leads to increased heating of the wastegate actuator, causing the actuator to approach its maximum acceptable operating temperature sooner than would otherwise be the case.

One approach that at least partially addresses the above issues includes a method of operating a wastegate, comprising determining a holding current with which to hold a wastegate valve at a desired position, the holding current determined based on a pressure differential across the wastegate valve.

In a more specific example, the desired position is a fully closed position.

In another aspect of the example, the pressure differential is determined based on turbine inlet pressure and turbine outlet pressure.

In yet another aspect of the example, determining the holding current includes for a first range of engine speeds, weighting an average pressure differential across the wastegate valve greater than a peak pressure differential across the wastegate valve, and, for a second range of engine speeds, weighting the peak pressure differential greater than the average pressure differential, the first range of engine speeds being greater than the second range of engine speeds.

In still another aspect of the example, the holding current is adjusted based on one or both of engine speed and load.

In this way, excessive power consumption by a wastegate actuator, excessive heat generation in the actuator, and excessive mechanical stress imposed on a wastegate valve may be mitigated. Thus, the technical result is achieved by these actions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

As described above, some internal combustion engines may use a compression device such as a turbocharger to increase the flow of air into the engine and thus increase torque/power output. The pressure delivered to the intake manifold, hereinafter referred to as "boost" or "boost pressure" may be controlled by adjusting the amount of gas reaching a turbine of the turbocharger, for example via a wastegate. An actuator, such as an electric actuator (e.g., electric motor) may be operatively coupled to a valve of the wastegate and driven to position the wastegate anywhere between a fully open position and a fully closed position to achieve the desired boost based on operating conditions. When maximum boost is desired, the actuator may position the wastegate valve at the fully closed position, and, in doing so, counteracts high exhaust pressures acting against the wastegate valve. To hold the wastegate valve at the fully closed position as long as desired, these exhaust pressures must be continually counteracted, requiring the continuous application of sufficient force to the valve and thus continuous consumption of sufficient current by the actuator. The current consumed by a wastegate actuator in attempting to hold a wastegate valve at its fully closed position (or a non-fully closed position) is referred to herein as "holding current".

Exhaust pressures acting against the wastegate valve typically vary throughout the course of engine operation. In some approaches to holding a wastegate valve at its fully closed position, the holding current used by a wastegate actuator to maintain the valve at this position is selected based on worst-case conditions—specifically, the maximum exhaust pressure that can potentially act against the valve. While ensuring that the wastegate valve is held at the fully closed position, this worst-case holding current frequently exceeds the current that would be sufficient to maintain the valve at the fully closed position. Such excessive holding current results in excessive power consumption by the actuator, excessive mechanical stress imposed on the wastegate valve and potentially other components of an associated wastegate assembly, and a faster approach to a maximum acceptable actuator temperature.

Figure 1:
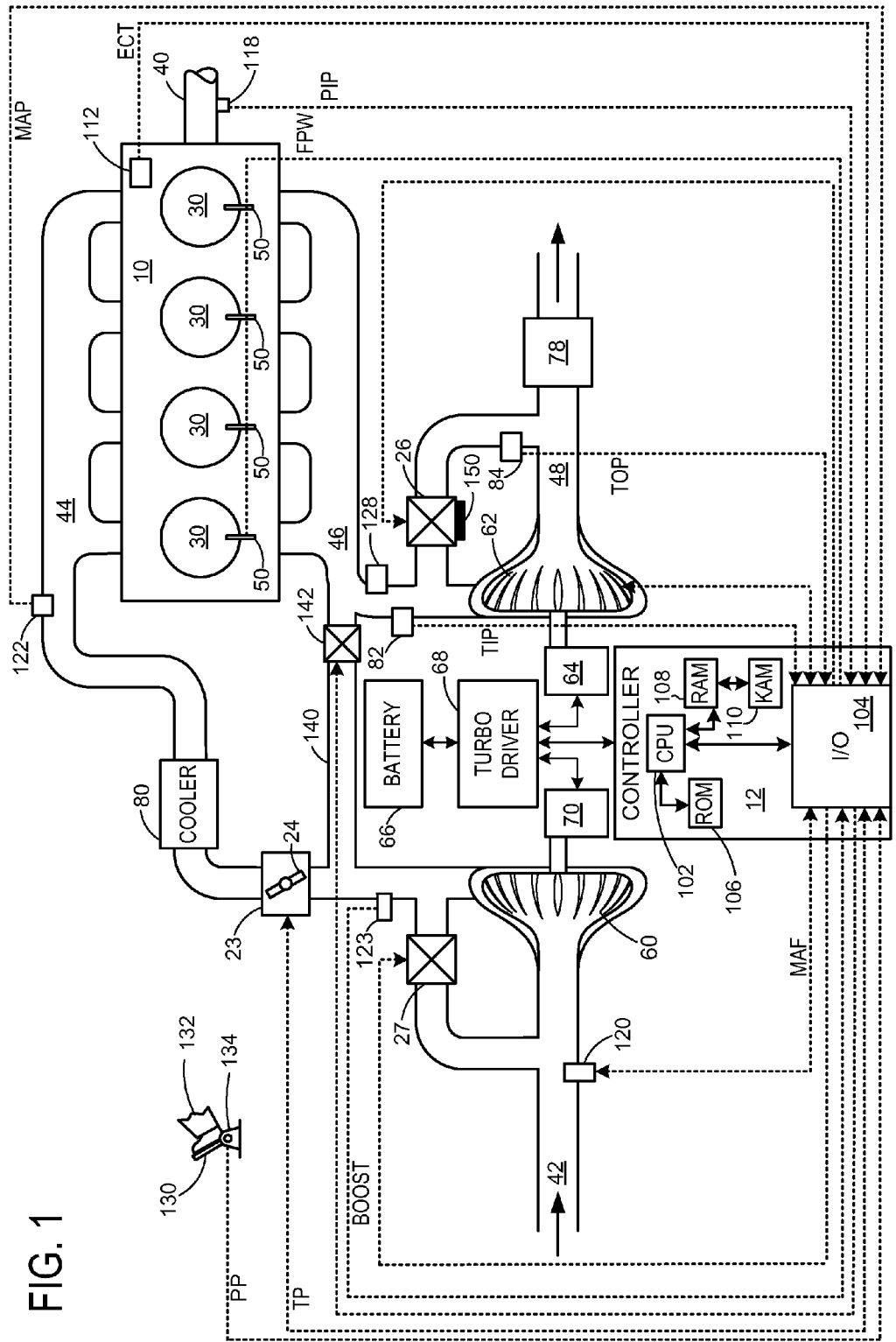
FIG. 1 shows a block diagram of a turbocharged engine including a wastegate.
Figure 2:
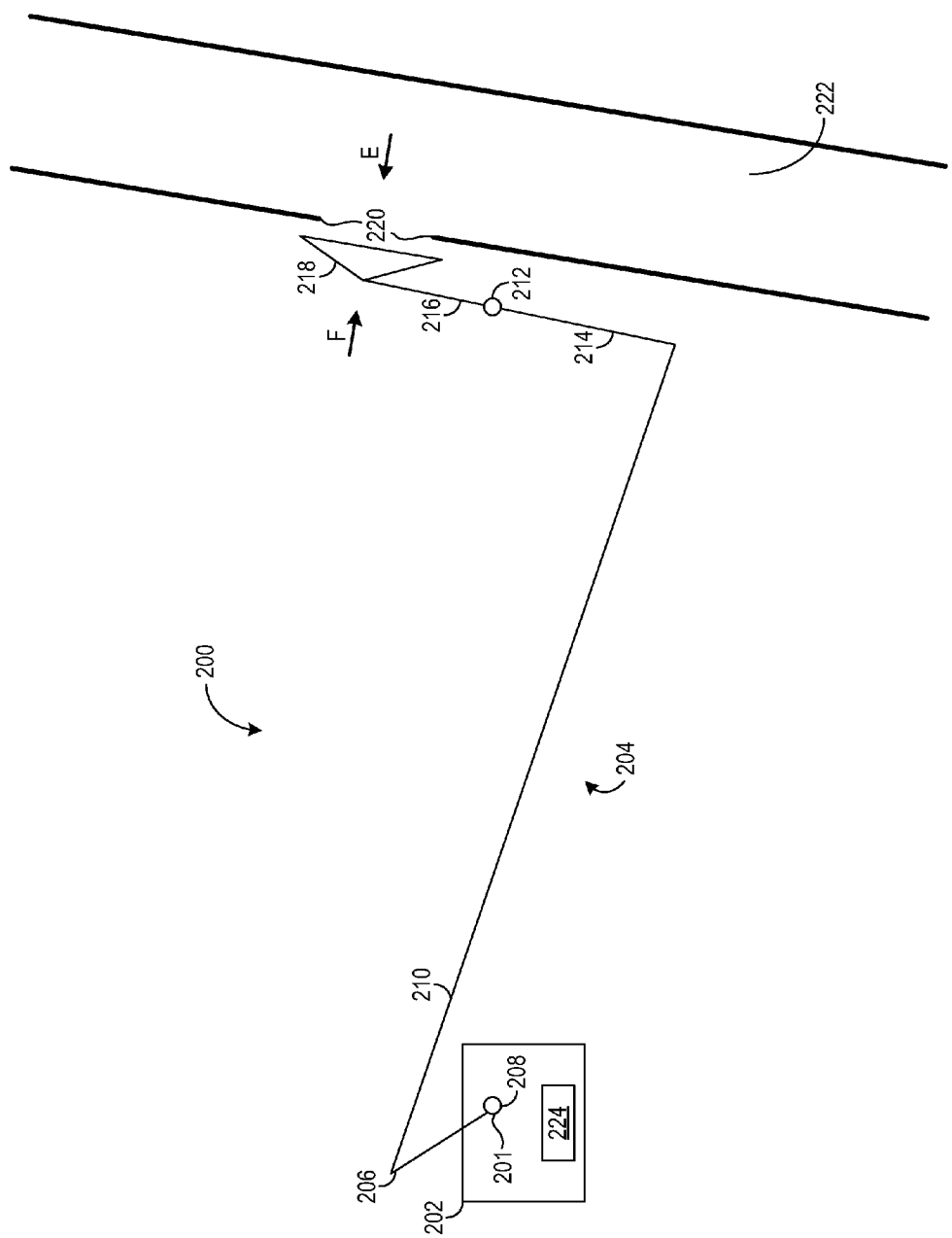
FIG. 2 shows an exemplary wastegate arrangement of the wastegate of FIG. 1.
Figure 3:
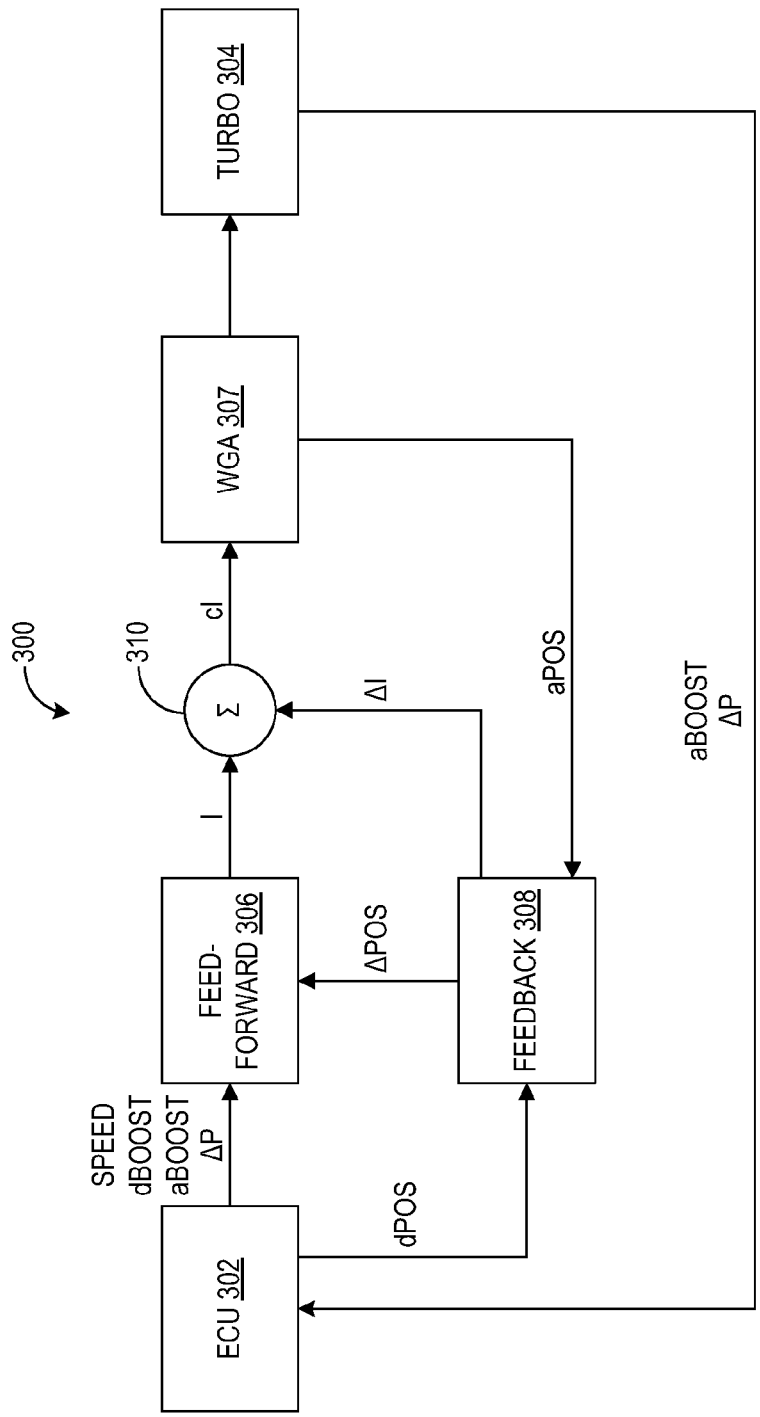
FIG. 3 shows an exemplary control system for operating the wastegate of FIG. 1.
Figure 4A:
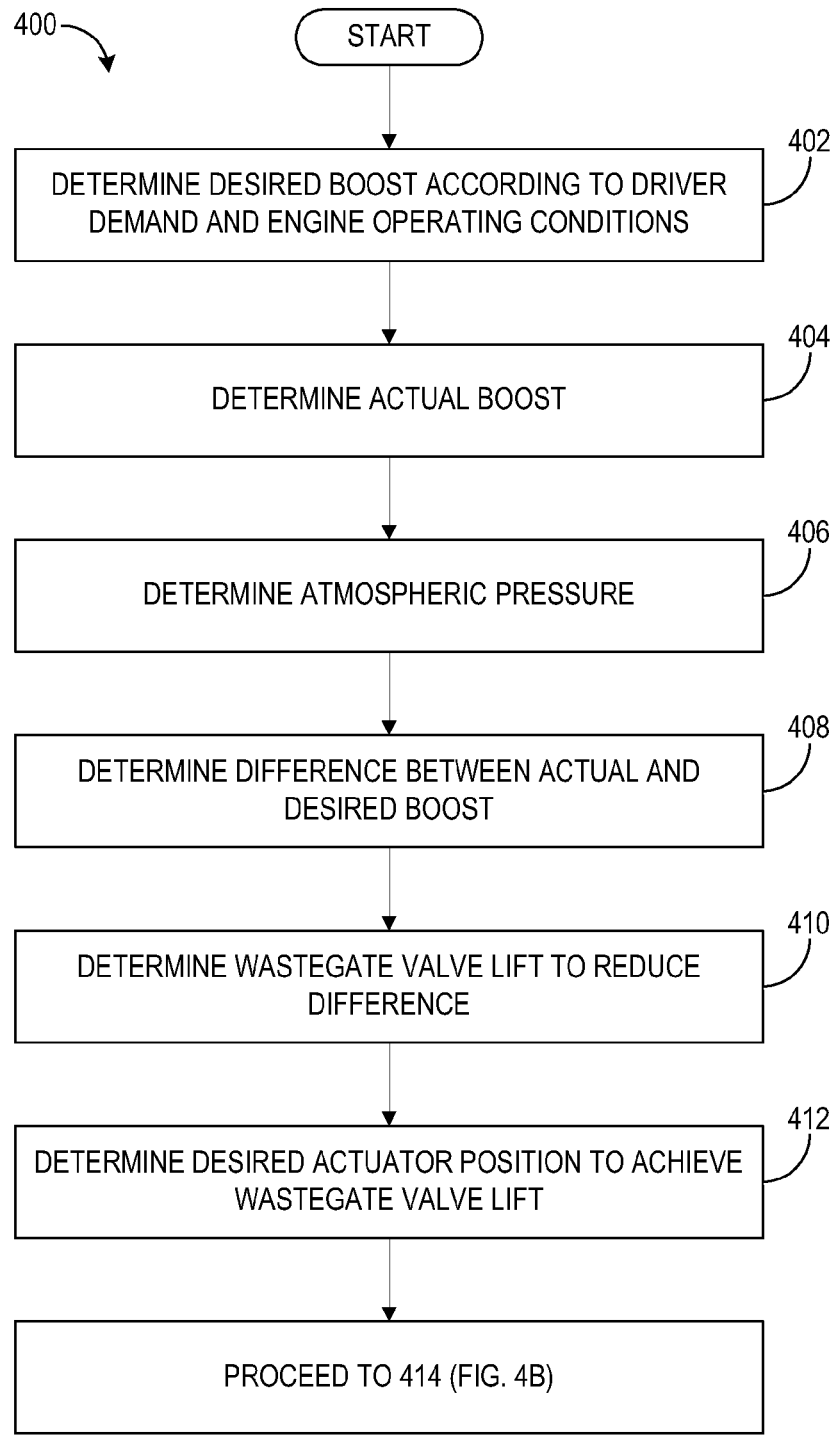
FIGS. 4A & 4B show a flowchart illustrating a method for controlling a turbocharger associated with the wastegate arrangement of FIG. 2.
Figure 4B:
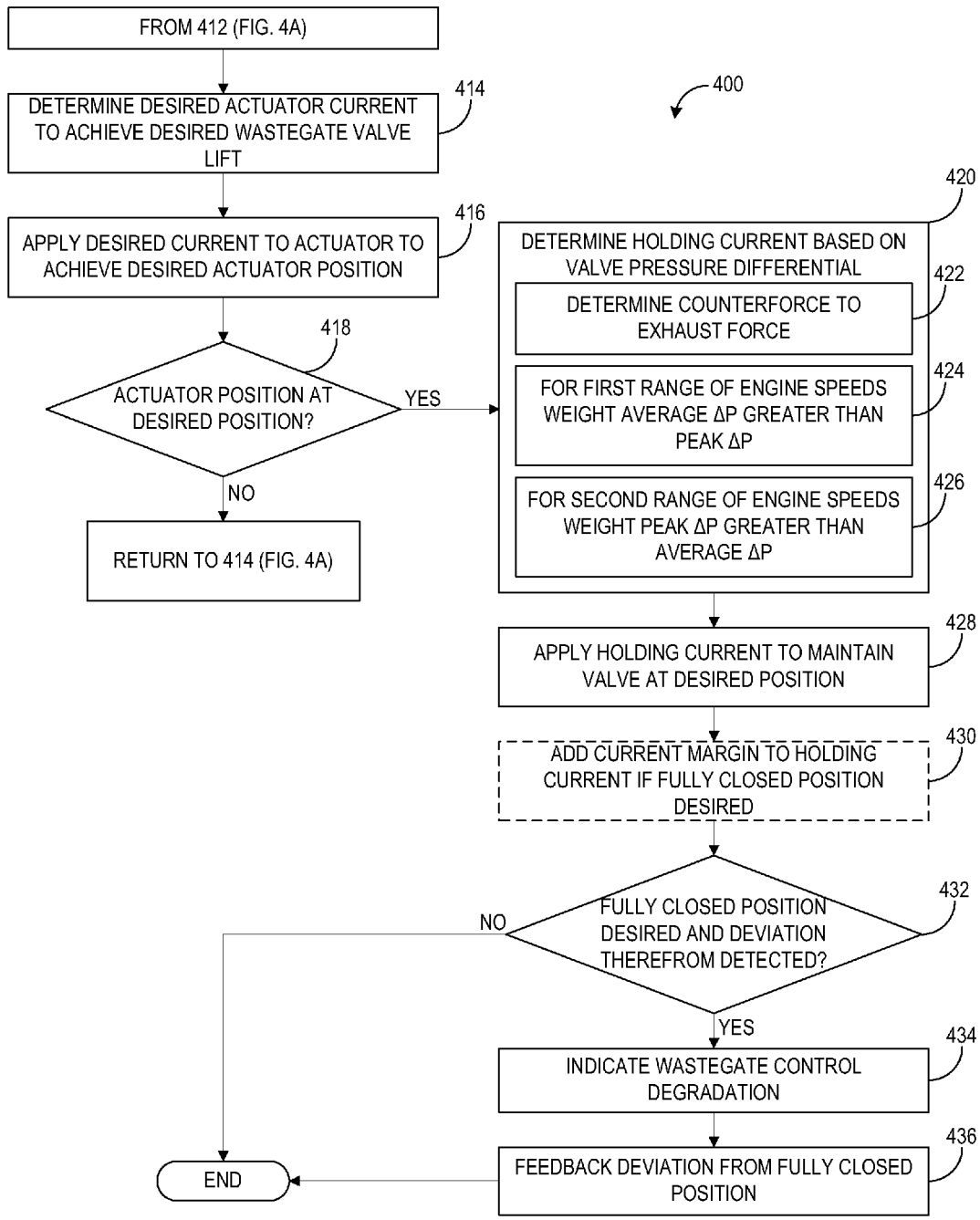
Figure 5:
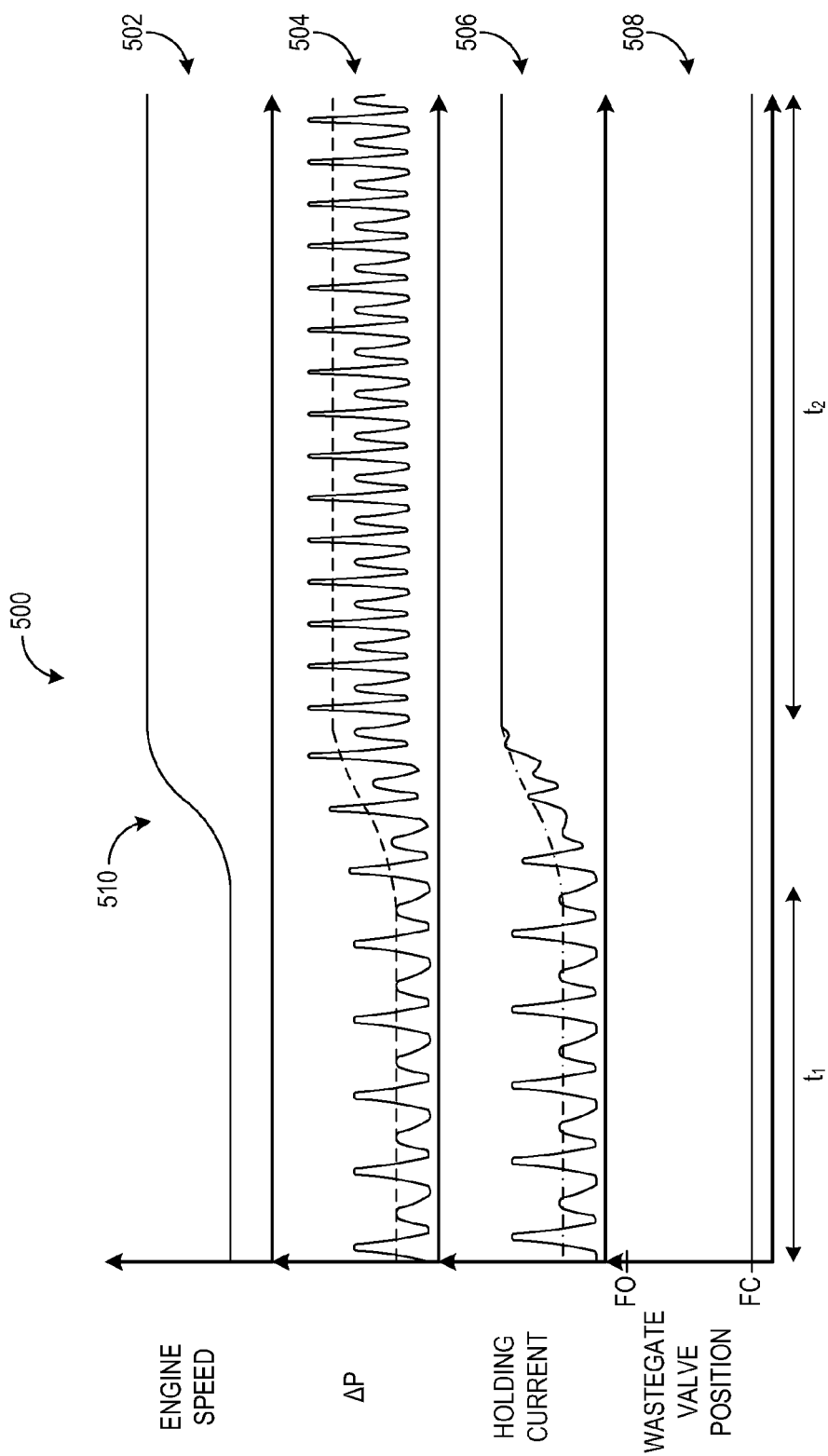
FIG. 5 shows a graph of an exemplary drive cycle.

Various methods for determining a holding current based on a pressure differential across a wastegate valve are thus provided. In one example, a method of operating a wastegate comprises determining a holding current with which to hold a wastegate valve at a desired position, the holding current determined based on a pressure differential across the wastegate valve. FIG. 1 shows a block diagram of a turbocharged engine including a wastegate, FIG. 2 shows an exemplary wastegate arrangement of the wastegate of FIG. 1, FIG. 3 shows an exemplary control system for operating the wastegate of FIG. 1, FIGS. 4A & 4B show a flowchart illustrating a method for controlling a turbocharger associated with the wastegate arrangement of FIG. 2, and FIG. 5 shows a graph of an exemplary drive cycle. The engine of FIG. 1 also includes a controller configured to carry out the methods depicted in FIGS. 4A-B.

FIG. 1 is a schematic diagram showing an example engine 10, which may be included in a propulsion system of an automobile. The engine 10 is shown with four cylinders 30. However, other numbers of cylinders may be use in accordance with the current disclosure. Engine 10 may be controlled at least partially by a control system including controller 12, and by input from a vehicle operator 132 via an input device 130. In this example, input device 130 includes an accelerator pedal and a pedal position sensor 134 for generating a proportional pedal position signal PP. Each combustion chamber (e.g., cylinder) 30 of engine 10 may include combustion chamber walls with a piston (not shown) positioned therein. The pistons may be coupled to a crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel to enable a starting operation of engine 10.

Combustion chambers 30 may receive intake air from intake manifold 44 via intake passage 42 and may exhaust combustion gases via exhaust passage 48. Intake manifold 44 and exhaust manifold 46 can selectively communicate with combustion chamber 30 via respective intake valves and exhaust valves (not shown). In some embodiments, combustion chamber 30 may include two or more intake valves and/or two or more exhaust valves.

Fuel injectors 50 are shown coupled directly to combustion chamber 30 for injecting fuel directly therein in proportion to the pulse width of signal FPW received from controller 12. In this manner, fuel injector 50 provides what is known as direct injection of fuel into combustion chamber 30. The fuel injector may be mounted in the side of the combustion chamber or in the top of the combustion chamber, for example. Fuel may be delivered to fuel injector 50 by a fuel system (not shown) including a fuel tank, a fuel pump, and a fuel rail. In some embodiments, combustion chambers 30 may alternatively, or additionally, include a fuel injector arranged in intake manifold 44 in a configuration that provides what is known as port injection of fuel into the intake port upstream from each combustion chamber 30.

Intake passage 42 may include throttle 23 having a throttle plate 24. In this particular example, the position of throttle plate 24 may be varied by controller 12 via signals provided to an actuator included with the throttle. In one example, the actuator may be an electric actuator (e.g., electric motor), a configuration that is commonly referred to as electronic throttle control (ETC). In this manner, throttle 23 may be operated to vary the intake air provided to combustion chamber 30 among other engine cylinders. The position of throttle plate 24 may be provided to controller 12 by throttle position signal TP. Intake passage 42 may further include a mass air flow sensor 120, a manifold air pressure sensor 122, and a throttle inlet pressure sensor 123 for providing respective signals MAF (mass airflow) MAP (manifold air pressure) to controller 12.

Exhaust passage 48 may receive exhaust gases from cylinders 30. Exhaust gas sensor 128 is shown coupled to exhaust passage 48 upstream of turbine 62 and emission control device 78. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO, a NOx, HC, or CO sensor, for example. Sensor 128 may alternately be positioned downstream of turbine 62. Emission control device 78 may be a three way catalyst (TWC), NOx trap, various other emission control devices, or combinations thereof.

Exhaust temperature may be measured by one or more temperature sensors (not shown) located in exhaust passage 48. Alternatively, exhaust temperature may be inferred based on engine operating conditions such as speed, load, air-fuel ratio (AFR), spark retard, etc.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112, shown schematically in one location within the engine 10; a profile ignition pickup signal (PIP) from Hall effect sensor 118 (or other type) coupled to crankshaft 40; the throttle position (TP) from a throttle position sensor, as discussed; and absolute manifold pressure signal, MAP, from sensor 122, as discussed. Engine speed signal, RPM, may be generated by controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft 40. In some examples, storage medium read-only memory 106 may be programmed with computer readable data representing instructions executable by processor 102 for performing the methods described below as well as other variants that are anticipated but not specifically listed.

Engine 10 may further include a compression device such as a turbocharger or supercharger including at least a compressor 60 arranged along intake passage 42. For a turbocharger, compressor 60 may be at least partially driven by a turbine 62, via, for example a shaft, or other coupling arrangement. The turbine 62 may be arranged along exhaust passage 48 and communicate with exhaust gasses flowing therethrough. Various arrangements may be provided to drive the compressor. For a supercharger, compressor 60 may be at least partially driven by the engine and/or an electric machine, and may not include a turbine. Thus, the amount of compression provided to one or more cylinders of the engine via a turbocharger or supercharger may be varied by controller 12. In some cases, the turbine 62 may drive, for example, an electric generator 64, to provide power to a battery 66 via a turbo driver 68. Power from the battery 66 may then be used to drive the compressor 60 via a motor 70. Further, a sensor 123 may be disposed in intake passage 42 for providing a BOOST signal to controller 12.

Further, exhaust passage 48 may include wastegate 26 for diverting exhaust gas away from turbine 62. In some embodiments, wastegate 26 may be a multi-staged wastegate, such as a two-staged wastegate with a first stage configured to control boost pressure and a second stage configured to increase heat flux to emission control device 78. Wastegate 26 may be operated with an actuator 150, which may be an electric actuator such as an electric motor, for example, though pneumatic actuators are also contemplated. Intake passage 42 may include a compressor bypass valve 27 configured to divert intake air around compressor 60. Wastegate 26 and/or compressor bypass valve 27 may be controlled by controller 12 via actuators (e.g., actuator 150) to be opened when a lower boost pressure is desired, for example.

FIG. 1 also shows the inclusion of a turbine inlet pressure sensor 82 and a turbine outlet pressure sensor 84, respectively configured to measure the pressure of exhaust gasses upstream and proximate an inlet of turbine 62, and the pressure of exhaust gasses downstream and proximate an outlet of the turbine. Turbine pressure sensors 82 and 84 are shown as outputting signals TIP and TOP, respectively, to controller 12, which may be cooperatively analyzed to determine a pressure differential across wastegate 26—particularly, the pressure differential across a wastegate valve of the wastegate. As described in further detail below, aspects of wastegate 26 may be controlled based on the pressure differential determined based on output from turbine pressure sensors 82 and 84, including but not limited to the holding current supplied to wastegate actuator 150 when attempting to hold the wastegate valve at its fully closed position. It will be appreciated, however, that the locations of turbine pressure sensors 82 and 84 are provided as non-limiting examples and may be varied without departing from the scope of this disclosure. Moreover, in other embodiments, turbine pressure sensors 82 and 84 may be omitted, in which case the pressure differential across the wastegate valve may be determined in other suitable manners (e.g., based on one or more of the MAF, MAP, and BOOST signals described above, and/or a wastegate position signal from a position sensor of wastegate 26 and engine speed based on the PIP signal).

Intake passage 42 may further include charge air cooler (CAC) 80 (e.g., an intercooler) to decrease the temperature of the turbocharged or supercharged intake gases. In some embodiments, charge air cooler 80 may be an air to air heat exchanger. In other embodiments, charge air cooler 80 may be an air to liquid heat exchanger. While shown as being positioned downstream of throttle 23, charge air cooler 80 may instead be positioned upstream throttle 23 without departing from the scope of this disclosure.

Further, in the disclosed embodiments, an exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Further, an EGR sensor (not shown) may be arranged within the EGR passage and may provide an indication of one or more of pressure, temperature, and concentration of the exhaust gas. Alternatively, the EGR may be controlled through a calculated value based on signals from the MAF sensor (upstream), MAP (intake manifold), MAT (manifold gas temperature) and the crank speed sensor. Further, the EGR may be controlled based on an exhaust $O_2$ sensor and/or an intake oxygen sensor (intake manifold). Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger. In other embodiments, the engine may additionally or alternatively include a low pressure EGR system where EGR is routed from downstream of a turbine of a turbocharger to upstream of a compressor of the turbocharger.

Turning now to FIG. 2, an exemplary wastegate arrangement 200 is shown. Wastegate 200 may be wastegate 26 of FIG. 1, for example. Wastegate 200 is operated by an actuator 202, which may be actuator 150 of FIG. 1. In this example, actuator 202 is an electric actuator such as an electric motor. In some examples, actuator 202 may particularly be a rotary actuator having an element that undergoes rotation to thereby alter the actuator position. An output shaft 201 of actuator 202 is coupled to a linkage 204 and in particular a first link 206 of the linkage. As shown, linkage 204 in the illustrated embodiment is a four-bar, though other linkages are possible such as a linear rod. Linkage 204 moves about two pivots including a first pivot 208 about which first link 206 rotates, and a second pivot 212 about which a third link 214 and a fourth link 216 rotate. Second link 210 may have pin joints at each end, for example. First, second, third, and fourth links 206, 210, 214, and 216 are commonly coupled to one another to form linkage 204 as a contiguous member. At an end opposite actuator 202, linkage 204 is coupled at fourth link 216 to a wastegate valve 218, which may be positioned at a fully open position, a fully closed position, or anywhere therebetween relative to a valve seat 220. Valve seat 220 is shown as being disposed in a portion of an exhaust passage 222, which may be exhaust passage 48 of engine 10 of FIG. 1, for example. By positioning wastegate valve 218 in this continuously variable manner, the amount of exhaust gas reaching a turbine (e.g., turbine 62 of FIG. 1) of a turbocharger may be controlled. In this way, the boost pressure delivered to an engine such as engine 10 of FIG. 1 may be controlled according to desired boost and other operating conditions. The position of wastegate valve 218 of wastegate 200 may be particularly controlled via actuation of actuator 202 and placement of its output shaft 201, movements of which may be translated to the exhaust valve via linkage 204.

As shown, wastegate 200 further includes a position sensor 224 that may be configured to measure changes in the angle of output shaft 201 to thereby estimate the location of wastegate valve 218. In some examples, a rotary encoder configured to sense rotation of a rotating component in actuator 202 may be employed, with pulses generated therefrom sent to controller 12 in FIG. 1. Position sensor 224 may be adapted for embodiments in which a linear rod linkage is used in lieu of the four-bar configuration shown in FIG. 2, however. In any case, a measurement by position sensor 224 may be used to determine the position of wastegate valve 218. In other embodiments, however, the position of wastegate valve may be determined based on a soft model using one or more of the signals (e.g., BOOST) described above with reference to FIG. 1 and sent to controller 12.

It will be appreciated that wastegate 200 and various components thereof may be modified without departing from the scope of this disclosure. For example, a current sensor and/or a force sensor may be included with actuator 202, in lieu of or in addition to position sensor 224. Current sensing may be facilitated via a sensor or probe, or in other examples may be calculated based on Ohm's law (or other relation) as the ratio of actuator voltage (e.g., terminal voltage) and actuator resistance (e.g., winding resistance), if these two quantities are known or can be measured or inferred. Further, as described above, other types of linkages may be provided to couple actuator 202 with wastegate valve 218, including but not limited to a linear rod. Moreover, a bias (not shown) may be coupled to wastegate valve 218 to position the valve in a default position when the valve is not actuated by actuator 202.

To position wastegate valve 218 at a desired position, adequate force is imparted to the valve to counteract forces acting against the valve arising from the flow of exhaust gasses through exhaust passage 222. As seen in FIG. 2, exhaust gasses act against wastegate valve 218 in a direction substantially and approximately aligned to a direction E, while actuator 202 imparts forces to the valve in a direction substantially and approximately aligned to a direction F, substantially antiparallel to direction E, to counteract the exhaust gas forces and position the valve at a desired position to provide desired boost. When a constant level of boost is desired, it is desired to hold wastegate valve 218 at a fixed position or "lift", which refers to the distance between an upper surface of valve seat 220 and a lower surface of the wastegate valve as used herein. In a specific example, maximum boost may be desired, in which case wastegate valve 218 may be held at its fully closed position (e.g., in contact with valve seat 220). During such conditions in which maintenance of a fixed wastegate valve lift is desired for longer than a threshold duration, the exhaust forces acting against wastegate valve 218 will vary due to operation of an associated engine (e.g., engine 10 of FIG. 1)—e.g., as a result of cyclical engine operation, and changes in engine speed and/or load. In some scenarios, the fluctuation in exhaust force acting against wastegate valve 218, and the fluctuation in the pressure differential across the wastegate valve, may be at least partially periodic. As described above, some approaches account for this variation by supplying a DC holding current to a wastegate actuator that enables the generation of a holding force to hold a wastegate valve at the fully closed position and counteract the maximum exhaust force that may potentially act against the wastegate valve. Consequently, this holding current will be excessive during at least some periods of engine operation in which the actual exhaust force acting against the wastegate valve is less than the maximum potential exhaust force, resulting in excessive current consumption by the wastegate actuator, excessive heat generation in the actuator, and excessive force imparted to the wastegate valve, which can potentially cause degradation in the wastegate assembly.

In contrast, holding currents, and their resulting forces imparted to wastegate valve 218, may instead be determined based on operating conditions of wastegate assembly 200. Specifically, holding currents supplied to and consumed by actuator 202 may be determined based on the pressure differential across wastegate valve 218. The pressure differential across wastegate valve 218 may be determined based on the difference between output from turbine inlet pressure sensor 82 and turbine outlet pressure sensor 84 (both of FIG. 1), for example, though in other embodiments the pressure differential may be determined based on one or more of the MAF, MAP, and BOOST signals of FIG. 1. In this way, wastegate valve 218 may be held at the fully closed position against valve seat 220 via a holding current and holding force sufficient to counteract the instant exhaust force acting against the valve. The holding current and force may further be dynamically adapted, particularly to account for the fluctuation in exhaust force due with engine operation at various speeds and loads (e.g., holding current may be increased as engine speed and/or load increase due to resultant increases in exhaust pressure). In this way, excessive power consumed by actuator 202 and excessive force imparted to wastegate valve 218 may both be mitigated. Nevertheless, in some approaches, a small margin (e.g., current increase) may be added to a holding current determined based on the pressure differential across wastegate valve 218 to better enable valve holding against valve seat 220 and delivery of desired boost.

In some examples, holding current adaptation may be carried out in different manners depending on engine speed (e.g., speed of engine 10 of FIG. 1). In a first range of engine speeds including middle to high engine speeds, the frequency of fluctuation in the pressure differential across wastegate valve 218 may be significantly higher than the mechanical bandwidth of wastegate 200. Accordingly, disturbances caused by such fluctuation may not significantly affect wastegate valve positioning in this range of engine speeds. As such, holding current adaptation in this first range of engine speeds may be carried out based on an average value of the pressure differential across wastegate valve 218, which may be in contrast to approaches in which holding current adaptation is carried out based on a peak value of the pressure differential.

Holding current adaptation may differ for a second range of engine speeds including low engine speeds. In some examples, the second range of engine speeds may fall entirely outside of the first range of engine speeds, in which case the first range of engine speeds may be greater than the second range of engine speeds. In other examples some overlap may exist between the first and second ranges. In the second range of engine speeds, the frequency of wastegate pressure differential fluctuation may be comparable to the mechanical bandwidth of wastegate 200. As such, holding current adaptation in the second range of engine speeds may assume one of two approaches: in the first, a holding current is determined such that a force sufficient to counteract the instant exhaust force acting against wastegate valve 218 is imparted to the valve. The counteracting force may be as near exactly opposite to the instant exhaust force as possible. Further, it will be appreciated that the frequency with which instant exhaust forces, and corresponding counteracting forces, are determined may assume various suitable values, and may be selected based on the frequency of pressure differential sensing and wastegate valve positioning dynamics. In the second approach, holding current adaptation may include determining a weighted pressure differential average by weighting average and peak pressure differentials across wastegate valve 218. Weights respective to the average and peak pressure differentials may be dynamically adjusted during operation based on engine speed—for example, at a lower range of engine speeds (e.g., the second range of engine speeds) the peak pressure differential may be weighted greater than the average pressure differential, while at a higher range of engine speeds the average pressure differential may be weighted greater than the peak pressure differential. As such, in some examples, non-oscillating holding currents may be selected even when the frequency of pressure differential fluctuation is comparable to the wastegate mechanical bandwidth. It will be appreciated that the transition between such weightings may be discrete in some examples, while in others it may be continuous (e.g., the average pressure differential is increasingly weighted more than the peak pressure differential in a linear fashion as engine speed increases). Further, weights may be adjusted based on feedback control described in further detail below.

In some examples, holding currents may be determined according to the following relation: $I_{holding}=K(RPM)*I_{peak}(RPM, \Delta P)+(1-K)*I_{avg}(RPM,\Delta P)$, where $I_{holding}$ is the holding current, K is a constant, $I_{peak}$ is the peak holding current in a suitable time interval, and $I_{avg}$ is the average holding current in the time interval. This relation thus enables determination of holding currents by weighting peak and average holding currents according to engine speed and pressure differential across wastegate valve 218, with the peak holding current being increasingly weighted greater than the average holding current as engine speed increases.

In some examples, cyclical engine operation may cause pressure differential fluctuation across wastegate valve 218 to be at least partially periodic. Holding current adaptation in this example may thus be carried out by overlaying one or more periodic functions onto wastegate control signals generated to induce wastegate valve holding and sent to actuator 202, causing a corresponding periodic variation in the holding current supplied to the actuator. The periodic functions may be at least partially sinusoidal in some examples, and may have various parameters (e.g., amplitude, frequency, phase, etc.) that may be dynamically adapted to pressure differential fluctuation—e.g., the period of a periodic function may be equated with the measured or inferred period of pressure differential fluctuation. Selection of the phase may account for exhaust flow and wastegate dynamics, and specifically the delay between pressure differential determination and holding current determination and application. In some examples, selection of phase (and/or other periodic function parameters) may include retrieving phases from a lookup table (e.g., via supplying pressure differential fluctuation frequency as an input into the lookup table). Oscillating holding currents may be selected in this manner according to the delay and responsiveness of wastegate 200 and the frequency of pressure differential fluctuation across wastegate valve 218; in some scenarios oscillating currents may not be selected if the responsiveness of the wastegate is not comparable to the frequency of pressure differential fluctuation, and, in yet other scenarios, oscillating currents may not be selected even if wastegate responsiveness is comparable to the pressure differential fluctuation frequency. Routines employed to carry out adaptive holding current determination in the manners described above may also include feedback control. In particular, the position of wastegate valve 218 (indicated by position sensor 224, for example) may be fed back from position sensor 224 to a feedback module where the fed back position and the fully closed position are compared to detect deviations from the fully closed position. Detected deviations may then be fed to a feed-forward module configured to determine one or more parameters (e.g., current to be supplied to actuator 202) that drive placement of wastegate valve 218, so that subsequent deviation may be mitigated. As a non-limiting example, deviations fed to the feed-forward module may be used to update a lookup table accessed by the feed-forward module that outputs the one or more parameters. Alternatively or additionally, the feedback module may analyze deviations to correct the one or more parameters output from the feed-forward module following their determination at the feed-forward module, which in some examples may include outputting a correction to a summation block that receives the one or more parameters, allowing the one or more parameters to be modified via the correction. FIG. 3 shows an exemplary control system that may implement the feedback and feed-forward control described herein.

For embodiments in which one or more periodic functions are employed in the course of holding current adaptation, one or more parameters (e.g., amplitude, frequency, phase, etc.) of the periodic functions may be adjusted according to fed back deviations, for example. In this way, maintenance of the fully closed position may be provided, and undesired valve deviation (e.g., opening) quickly corrected.

In some examples, detected deviation from the fully closed position may be used as an indication of degradation in wastegate control—e.g., deviation may be interpreted as degradation in the operation of actuator 202 (e.g., specifically that the actuator is providing less torque than expected for a given current), and/or as degradation in pressure differential determination (e.g., specifically, that operation of one or both of sensors 82 and 84 has degraded). As a non-limiting example, application of a counteracting force to wastegate valve 218, determined to sufficiently counteract the instant exhaust force and hold the valve against valve seat 220, that does not result in sustained contact with the valve seat may be interpreted as degradation in wastegate control. In some embodiments, detection of degradation may be relayed to a vehicle operator via one or more dashboard indicators, for example. Alternatively or additionally, one or more diagnostic codes may be set in response to detection of degradation. As described above, the application of weights to average and peak pressure differentials may be adjusted in response to detection of degradation; for example, detection of degradation may be interpreted as an indication that one of the average and peak pressure differentials should be weighted greater than the other.

While described with reference to fully closed positions, it will be appreciated that, in some examples, the holding current determination responsive to instant pressure differential and to fluctuation in pressure differential described above may be carried out when holding wastegate valve 218 at a non-fully closed position is desired. In still other examples, positioning of wastegate valve 218 may be adapted to pressure differential dynamics—that is, the wastegate valve may be controlled according to such dynamics when undergoing motion (e.g., as a result of a change in desired boost), which may be employed alternatively or additionally to one or both of fully closed position holding current determination and non-fully closed position holding current determination described above. In this example, the current supplied to actuator 202 to drive motion in wastegate valve 218 may be varied according to the fluctuation in pressure differential across the valve. In some scenarios, such variation may be accomplished by overlaying one or more periodic functions on wastegate control signals sent to actuator 202, where properties of the functions (e.g., amplitude, frequency, phase, etc.) are determined according to the pressure differential fluctuation, as described above. In either case that valve holding at non-fully closed positions and valve positioning during motion are adapted according to pressure differential fluctuation, the adaptation may account for differences in the effects produced by exhaust forces when wastegate valve 218 is positioned at a partially (or fully) open position, compared to the fully closed position; for example, the adaptation may account for the diffraction of pressure waves resulting from exhaust flow into the opening in exhaust passage 222 created by the partial (or full) valve opening.

Turning now to FIG. 3, an exemplary control system 300 for operating a wastegate is shown. With references to FIG. 2, control system 300 may be employed to operate wastegate 200, for example, and may be configured to hold wastegate valve 218 at the fully closed position (e.g., in contact with valve seat 220 via intermediate components such as actuator 202) with a holding current determined based on the pressure differential across the wastegate valve and fluctuations in the pressure differential. In some examples, control system 300 may determine holding currents responsive to wastegate valve pressure differential for non-fully closed positions (e.g., at least partially open lifts) and/or may adapt valve positioning when undergoing motion to fluctuations in wastegate valve pressure differential.

Control system 300 first includes an engine control unit (ECU) 302 such as controller 12 of FIG. 1. ECU 302 receives a variety of signals from various sensors and is operable to actuate (e.g., electrically) a variety of components. In particular, ECU 302 receives an indication of the pressure differential (labeled "ΔP") across the wastegate valve from a turbocharger system 304, which may be determined based on the difference between associated pairs of readings (e.g., TIP, TOP signals) from turbine inlet pressure sensor 82 and turbine outlet pressure sensor 84, both of FIG. 1, for example. The pressure differential may be sent to ECU 302 as a singular signal, while in other embodiments pairs of measured or estimated turbine inlet and outlet pressures may be sent to the ECU where the pressure differential may be determined. A turbocharger system 304 may further send an indication of the actual boost pressure (labeled "aBOOST") being delivered to an intake manifold (or other location) to ECU 302, which may be the BOOST signal of FIG. 1 measured via sensor 123, for example.

ECU 302 may receive other signals in addition to those described above, including but not limited to an indication of engine speed (labeled "SPEED"), which may be based on PIP signals provided by sensor 118 of FIG. 1, and the desired boost (labeled "dBOOST"), which may in part be based on the PP signal of FIG. 1 provided by pedal position sensor 134, for example. dBOOST, aBOOST, ΔP, and SPEED, among potentially other parameters (e.g., an indication of engine load), may be sent from ECU 302 to a feed-forward module 306 configured to determine one or more parameters that drive placement of the wastegate valve. The one or more parameters may include a holding current that may be supplied to a wastegate actuator 307 that, via reception of the holding current, holds the wastegate valve at the fully closed position. As feed-forward module 306 receives ΔP, holding currents may be dynamically adapted to instant pressure differential across the wastegate valve, instant engine speed and/or load, and/or fluctuations in the pressure differential, mitigating excessive power consumption by wastegate actuator 307 and heat generation therein, and excessive mechanical stress imposed on the wastegate assembly. In some examples, feed-forward module 306 may add a current margin to a determined holding current to provide valve seat contact.

Feed-forward module 306 may determine one or more parameters prior to determining a holding current, including but not limited to a desired wastegate valve position (e.g., the fully closed position), a desired wastegate actuator position (e.g., rotational orientation) to achieve the desired wastegate valve position, and a desired wastegate actuation force (or torque) on which the holding current may be based. Determination of one or more of these parameters may include mapping one or more of the parameters to a wastegate duty cycle using one or more lookup tables or other suitable data structure(s). The duty cycle may then be generated at feed-forward module 306 or elsewhere and sent to wastegate actuator 307 to achieve the one or more parameters. A wastegate control (WGC) signal may implement the duty cycle via pulse width modulation, for example.

While not shown, ECU 302 may also send an indication of the instant location of the end stop (e.g., valve seat 220) of the wastegate valve to feed-forward module 306, as this location, corresponding to the fully closed position of the valve, may vary throughout engine operation due, for example, to thermal deformation arising from hot exhaust gas flow and mechanical stress imposed on the valve and wastegate assembly by wastegate actuation and exhaust gas flow. The end stop location may be updated throughout engine operation at various suitable intervals based on known relations that quantify the change in end stop location as a function of various parameters (e.g., temperature, exhaust flow, etc.) and/or actual measurement of the end stop location.

As described above, the pressure differential across the wastegate valve may fluctuate in an at least partially periodic manner due to cyclical engine operation. The wastegate valve may be actuated according to this periodic fluctuation, which may be quantified via pressure differential sensing in the manners described above and/or based on predetermined knowledge of engine operation (e.g., offline assessment of exhaust pressure fluctuation as a function of various engine operating parameters). Wastegate valve actuation according to periodic pressure differential fluctuation may include overlaying one or more periodic functions onto the WGC, which may be carried out by adjusting the duty cycle. As described above, the one or more periodic functions may be at least partially sinusoidal in some examples, and may have various parameters (e.g., amplitude, frequency, phase, etc.) that may be dynamically adapted to pressure differential fluctuation. Selection of the phase may account for exhaust flow and wastegate dynamics, and specifically the delay between pressure differential determination and holding current determination and application. In some examples, selection of phase (and/or other periodic function parameters) may include retrieving phases from a lookup table (e.g., via supplying pressure differential fluctuation frequency as an input into the lookup table).

As described above, holding current adaptation may vary depending on engine speed indicated by the SPEED signal; for a first range of engine speeds including middle to high engine speeds, the holding current may be determined based on the average pressure differential (computed for a suitable time interval), while for a second range of engine speeds including low engine speeds the holding current may be determined based on weighted average pressure differential and weighted peak pressure differential, with the peak pressure differential being weighted greater than the average pressure differential in this range of engine speeds. In some examples, non-oscillating holding currents may be selected for both the first and second engine speed ranges.

Control system 300 further includes a feedback module 308 operable to detect wastegate valve position deviations from the fully closed position so that such deviations may be corrected and the wastegate valve maintained at the fully closed position. Feedback module 308 may also enable indication of wastegate control degradation in response to detection of wastegate valve position deviations from the fully closed position in the manners described above, in which case the feedback module may relay indications of deviations to ECU 302. As shown, feedback module 308 receives an indication of the desired wastegate valve position (labeled "dPOS") from ECU 302, and an indication of the actual wastegate valve position (labeled "aPOS") from wastegate actuator 307, which may be specifically provided by position sensor 224 of FIG. 2. Feedback module 308 may determine a difference between the desired and actual wastegate valve positions (labeled "ΔPOS") and relay this difference to feed-forward module 306 so that subsequently determined desired wastegate valve positions may be corrected based on the difference. In particular, the difference may cause an adjustment in the one or more parameters determined by feed-forward module 306, such as holding current. In this example, the holding current may be modified based on deviation from the desired wastegate valve position. Further, the difference may cause an adjustment to one or more data structures (e.g., lookup table) employed by feed-forward module 306 parameters (e.g., amplitude, frequency, phase, etc.) of the one or more periodic functions if employed, and/or average and peak pressure differential weights described above. Feedback module 308 may also relay an indication of wastegate valve position deviation to a summation block 310 which also receives output from feed-forward module 306. In the depicted example, feed-forward module 306 outputs a holding current (labeled "I") to summation block 310, while feedback module 308 outputs a holding current difference (labeled "ΔI") to the summation block so that the holding current may be corrected based on the holding current difference. A corrected holding current (labeled "cI") may then be issued from summation block 310 to wastegate actuator 307 to enable wastegate valve holding at the fully closed position.

It will be appreciated that the type of output fed to summation block 310 from feedback module 308 may depend on the type of output fed to the summation block from feed-forward module 306—namely, the two types may correspond to each other to enable correction of the output from the feed-forward module at the summation block. For embodiments in which feedback module 308 outputs a holding current difference, the feedback module may utilize a lookup table to translate a difference between actual and desired wastegate valve positions to a holding current difference, for example. Moreover, other parameters alternatively or in addition to holding current may be supplied to wastegate actuator 307, such as holding force. Generally, the parameters shown as being received and relayed by the modules of control system 300 may be modified without departing from the scope of this disclosure. Still further, some elements of control system 300 may not be employed during certain select operating conditions—e.g., feedback module 308 may not be employed when wastegate valve holding at the fully closed position is not desired.

FIGS. 4A and 4B show a flowchart illustrating a method 400 for controlling a turbocharger via a wastegate. Method 400 may be stored as machine-readable instructions executable by an engine controller (e.g., controller 12 of FIG. 1, ECU 302 of FIG. 3) and implemented via control system 300 of FIG. 3 to control wastegate 200 of FIG. 2, for example. In one example, a method of controlling the turbocharger via the wastegate may comprise determining a desired boost pressure and an actual boost pressure. The wastegate may be adjusted according to a difference between the desired boost pressure and the actual boost pressure, among other parameters described below.

At 402 of the method, the method includes determining a desired boost according to driver demand and engine operating conditions. The conditions assessed may be directly measured with sensors, such as sensors 112, 118, 120, 122, 123, and 134 for example, and/or the conditions may be estimated from other engine operating conditions. The assessed conditions may include engine coolant temperature, engine oil temperature, mass airflow (MAF), manifold pressure (MAP), boost (for example, BOOST pressure from sensor 123), engine speed, idle speed, barometric pressure, a driver-demanded torque (based on output from pedal position sensor 134, for example), air temperature, vehicle speed, etc.

Next, at 404 of the method, an actual boost pressure is determined. The actual boost may be directly measured from a sensor, such as sensor 123. The measurement may be sent to controller 12 via the BOOST signal and stored in a computer-readable storage medium (e.g., ROM 106, RAM 108, and/or KAM 110 of controller 12 in FIG. 1). In an alternative embodiment, the actual boost pressure may be estimated based on other operating parameters, such as MAP and RPM (or SPEED), for example.

Next, at 406 of the method, atmospheric pressure is determined. For example, atmospheric pressure may be measured from the MAP sensor at engine start-up, and/or estimated based on operating conditions of the engine, including MAF, MAP, throttle position, etc. The measurement may be sent to the engine controller and stored in the computer readable storage medium. In an alternative embodiment, the atmospheric pressure may be estimated based on other operating parameters.

Next, at 408 of the method, a difference between the actual and desired boost is determined. The engine controller may determine the difference, for example. In some examples, the difference may be determined by subtracting the desired boost from the actual boost.

Next, at 410 of the method, a wastegate valve lift is determined in order to reduce the difference between the actual and desired boost determined at 408. In some examples, the difference between the actual and desired boost, in addition to the current wastegate valve lift (e.g., sensed via position sensor 224 of FIG. 2), is fed to a suitable control mechanism configured to determine a wastegate valve lift in order to reduce this difference. For example, the wastegate valve lift may be used as an input to wastegate dynamics. In some actuators, the wastegate controller determines a duty cycle based on the difference between the desired and actual wastegate positions. A wastegate control (WGC) signal may include pulse width modulation via the wastegate duty cycle to adjust the wastegate. The wastegate valve lift may be achieved by feed-forward, feedback, and/or other control algorithms, for example.

A compensation term may account for delays of the wastegate actuator. Additionally, the compensation term may further include adjustments based on movement of twin independent cams, which can affect boost pressure. For example, as the intake cam is moved in a way that would increase boost pressure relative to atmospheric pressure, the magnitude of the compensation term may be decreased. Likewise, as the intake cam is moved in a way that would decrease boost pressure relative to atmospheric pressure, the magnitude of the compensation term may be increased.

Next, at 412 of the method, a desired actuator position is determined to achieve the wastegate valve lift determined at 410. The desired actuator position may be fed as an input to various suitable control mechanisms including those described above. In some embodiments, a desired actuator orientation may be alternatively determined, such as the rotational orientation of a rotating component in the actuator.

Turning now to FIG. 4B, the method continues at 414 where a desired actuator current is determined to achieve the desired wastegate valve lift. The desired actuator current may be determined based on the difference between the instant actuator position and the desired actuator position, as well as exhaust forces acting against the wastegate valve.

Next, at 416 of the method, the desired actuator current is applied to the wastegate actuator to achieve the desired actuator position. A suitable voltage-to-current conversion mechanism may convert a voltage generated by the engine controller to generate the current.

Next, at 418 of the method, it is determined whether the actuator position is at the desired actuator position. Here, the sensed actuator position may be compared to the desired actuator position. In some examples, if the desired wastegate valve position is the fully closed position, an actuator position corresponding to the instant fully closed wastegate valve position may be retrieved (e.g., from the engine controller) to compensate variation in the location of the wastegate valve end stop, to which the fully closed position corresponds, due to thermal deformation and/or mechanical stress as described above. If the actuator position is not at the desired actuator position (NO), the method returns to 414. If the actuator position is at the desired actuator position (YES), the method proceeds to 420.

At 420 of the method, a holding current with which, via application to the wastegate actuator, the actuator may be maintained at the desired actuator position is determined based on the pressure differential across the wastegate valve. Determination of the holding current may be carried out via feed-forward module 306 of FIG. 3, for example. Maintenance of the desired actuator via the holding current in turn allows the desired wastegate valve position (e.g., the position determined at 410) to be maintained. As described above, in some examples the pressure differential across the wastegate valve may be determined based on a difference between output from a turbine inlet pressure sensor and output from a turbine outlet pressure sensor. Determination of the holding current at 420 may include, at 422, determining a counteracting force that may be imparted to the wastegate valve to counteract the exhaust force acting against the valve. The counteracting force may be as near exactly opposite to the instant exhaust force as possible. Determination of the holding current at 420 may include, at 424, weighting an average pressure differential greater than a peak pressure differential for a first range of engine speeds including middle to high engine speeds. Determination of the holding current at 420 may still further include, at 426, weighting a peak pressure differential greater than an average pressure differential for a second range of engine speeds including low engine speeds. The average and peak pressure differentials may be determined in any suitable time interval, which may be selected based on wastegate and exhaust dynamics and/or various other engine operating conditions, for example. It will be appreciated that adjustments to average and peak pressure differential weights may be discrete in some embodiments and continuous in others. Further, at some engine speeds, one of the average and peak pressure differential weights may be equal to zero.

In some examples, counteracting forces may be determined at 422 for the second range of lower engine speeds at a frequency approximately corresponding to the frequency of pressure differential fluctuation, as the mechanical bandwidth of the wastegate assembly is comparable to the pressure differential fluctuation frequency. In this speed range, the frequency of holding current fluctuation may approximately correspond to the pressure differential fluctuation frequency to maximize adaptation of holding current frequency. Other parameters of the holding current may be adjusted responsive to pressure differential fluctuation so that, in some examples, a magnitude and phase of an oscillating holding current is adjusted while the wastegate is held in a fully closed position based on an oscillating pressure differential across the wastegate valve. In some examples, the magnitude and phase of an oscillating actuating current may be adjusted while the wastegate is held in a non-fully closed position based on the oscillating pressure differential across the wastegate valve. Wastegate control in this manner, however, may be eschewed for the first range of engine speeds, as the pressure differential fluctuation frequency may exceed the wastegate mechanical bandwidth. As such, in this speed range, counterforces and holding currents may correspond more to linear functions based on preferential weighting to the peak pressure differential. In some examples, counterforce and holding current determination may include some periodic variation in the first speed range and/or a range between the first and second speed ranges, though in other examples such determination may not include periodic variation. In other examples, non-oscillating holding currents may be selected for both the first and second engine speed ranges.

Next, at 428 of the method, the holding current determined at 420 is applied to the wastegate actuator to maintain the wastegate valve at the desired wastegate valve position.

Next, at 430 of the method, a current margin may optionally be added to the holding current determined at 420 if the fully closed wastegate valve position was desired. Addition of the current margin may better enable holding of the wastegate valve against its valve seat.

Next, at 432 of the method, it is determined whether deviation from the fully closed wastegate valve position has been detected, if the fully closed position was the desired wastegate valve position. Deviation from the fully closed position may be detected by monitoring output from position sensor 224 of FIG. 2, for example. If it is determined that deviation from the fully closed position has been detected (YES), the method proceeds to 434. If it is determined that deviation from the fully closed position has not been detected (NO), the method proceeds to 438.

At 434 of the method, wastegate control degradation is indicated. As described above, deviation from the fully closed wastegate valve position may indicate degradation of wastegate valve positioning and/or pressure differential measurement/sensing. Indication of degradation may include relaying the indication to a vehicle operator via one or more dashboard indicators and/or setting a diagnostic code, for example.

Next, at 436 of the method, the deviation from the fully closed wastegate valve position is fed back. As described above, the deviation may be fed back to a mechanism configured to determine the holding current—e.g., with reference to FIG. 3, the deviation may be determined at feedback module 308 via comparison of desired and actual wastegate valve positions (or, alternatively, actuator positions) and fed to feed-forward module 306, which may use the deviation to inform subsequent generation of holding currents (and potentially other parameters). This may include updating one or more data structures (e.g., lookup table) and/or periodic functions, as described above. Alternatively or additionally, the deviation may be fed to a summation block (e.g., block 310 of FIG. 3) that receives output from the holding current determination mechanism (e.g., feed-forward module 306) to correct this output from the holding current determination mechanism. Following 436, the method ends.

Thus, as shown and described, excessive wastegate actuator power consumption, heat generation, and excessive mechanical stress imposed by the actuator on a wastegate valve, and potentially other components of a wastegate assembly, may be mitigated by determining wastegate valve holding currents based on the pressure differential across the valve. In some examples, the holding current may be employed to hold the wastegate valve against its valve seat. Alternatively or additionally, holding currents may be determined for partially or fully open lifts. Still further, wastegate valve motion may be adapted to fluctuations in pressure differential. It will be appreciated that various modifications may be made to the systems shown in FIGS. 1-3 and method 400 without departing from the scope of this disclosure. For example, the parameters assessed by control system 300 of FIG. 3 and by method 400 may be modified. Moreover, at least some of the approaches described herein may be applied to non-electric wastegates; for example, wastegate valve positioning in a pneumatic wastegate may be adapted to engine speed and particularly to average and peak pressure differential weight adjustment according to such engine speed.

Turning now to FIG. 5, a graph 500 of an exemplary drive cycle is shown. As indicated at 502, graph 500 includes a plot of engine speed which, in a first duration $t_1$, assumes a speed falling within a second range of lower engine speeds. In this first duration throughout $t_1$, the pressure differential across a wastegate valve, indicated at 504, fluctuates in a periodic manner in correspondence with engine firing events throughout a relatively low range of pressures. A holding current determined in the manners described above and intended to, via supplication to a wastegate valve actuator, hold the wastegate valve at its fully closed position, accordingly varies in a similarly periodic fashion such that the holding current is adapted to the pressure differential in the second speed range, as indicated at 506. FIG. 5 also shows the potential alternative selection of a non-oscillating holding current, represented by dot-dash lines, in the second speed range. Throughout this drive cycle, the wastegate valve remains at the fully closed position (labeled "FC" in FIG. 5), as indicated at 508. The engine speed then transitions, as indicated at 510, to a speed falling within a first range of engine speeds relatively higher than the second range of engine speeds, where it remains for the remainder of the drive cycle throughout a second duration $t_2$. Holding currents in this example are determined based on a weighted average of average and peak pressure differential. As indicated by the dashed line at 504, the average pressure differential is weighted greater than the peak pressure differential throughout the first duration $t_1$, whereas the peak pressure differential is weighted greater than the average pressure differential in the second duration $t_2$. In this example, the transition between weightings is relatively continuous, but may be more discrete in other examples. As indicated at 506, holding current determination changes with the transition to the second speed range as well; in the transitional region indicated at 510 between $t_1$ and $t_2$, holding current determination transitions from being periodically responsive to pressure differential fluctuation to being a non-oscillating value preferentially determined based on peak pressure differential, as in the second speed range the frequency of pressure differential fluctuation exceeds the mechanical bandwidth of wastegate valve actuation. In this transitional region, the exhaust pressure and holding current both increase. While holding current determination exhibits an at least partially periodic quality in the transitional region, in other examples the switch between periodicity and a non-oscillating value may be more discrete. The holding current may alternatively be non-oscillating in the transitional region. Further, although not shown, holding currents may exhibit some periodicity and/or aperiodicity in the second speed range in some embodiments. As seen in the first duration, a phase difference between pressure differential fluctuation and holding current determination exists due to exhaust flow and wastegate dynamics. It will be appreciated that drive cycle 500 and the plots shown therein are provided as examples and are not intended to be limiting.

Generally, holding current determination in some examples may include, for a lower range of engine speeds, periodically oscillating the holding current in correspondence with periodic fluctuation of the pressure differential, and, for a higher range of engine speeds, selecting a non-oscillating current based on the pressure differential. However, in other examples, a non-oscillating current may be selected for the lower range of engine speeds.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of operating a wastegate, comprising:
with a controller,
determining an oscillating pressure differential across a wastegate valve based on a difference between outputs of a turbocharger turbine inlet pressure sensor and a turbocharger turbine outlet pressure sensor over a time interval; and
adjusting a magnitude and phase of an oscillating holding current applied to a wastegate actuator operatively coupled to the wastegate valve, while the wastegate valve is held in a fully closed position by the wastegate actuator, based on the oscillating pressure differential across the wastegate valve.

2. The method of claim 1, further comprising, during selected operating conditions, with the controller, applying a non-oscillating holding current rather than the oscillating holding current to the wastegate actuator.

3. A method of operating a wastegate, comprising:
with a controller,
determining a pressure differential across a turbocharger wastegate valve of an engine based on pressures measured by pressure sensors located upstream and downstream of a turbocharger turbine, respectively;
determining a holding current based on fluctuations in the pressure differential across the wastegate valve; and
applying the holding current to a wastegate actuator operatively coupled to the wastegate valve to hold the wastegate valve in a desired position.

4. The method of claim 3, wherein the desired position is a fully closed position.

5. The method of claim 3, wherein adjusting the holding current includes:
with the controller, determining a speed of the engine, an average pressure differential across the wastegate valve, and a peak pressure differential across the wastegate valve;
for a first range of engine speeds, weighting the average pressure differential across the wastegate valve greater than the peak pressure differential across the wastegate valve; and
for a second range of engine speeds, weighting the peak pressure differential greater than the average pressure differential, the first range of engine speeds being greater than the second range of engine speeds.

6. The method of claim 3, wherein the desired position is an at least partially open position of the wastegate valve.

7. The method of claim 3, further comprising:
with the controller, determining engine speed and load,
wherein the determination of the holding current is further based on one or both of the engine speed and load.

8. The method of claim 3, further comprising:
with the controller,
determining engine speed;
determining an average holding current and a peak holding current applied to the wastegate actuator over a time interval; and
wherein adjusting the holding current includes increasingly weighting the peak holding current greater than the average holding current as engine speed increases,
wherein the determination of the holding current is further based on the weighting of the peak holding current and the average holding current.

9. The method of claim 3, wherein when the holding current is applied to the wastegate actuator, the wastegate valve is held in a desired position, the method further comprising:
detecting a deviation of the wastegate valve from the desired position; and
modifying the holding current applied to the wastegate actuator based on the deviation.

10. The method of claim 9, wherein the determination of the holding current is further based on a weighted average of an average pressure differential across the wastegate valve and a peak pressure differential across the wastegate valve, the method further comprising adjusting respective weights of the average and peak pressure differentials based on the deviation.

11. The method of claim 3, wherein adjusting the holding current includes:
with the controller,
determining engine speed and load,
for a first range of engine speeds, periodically oscillating the holding current applied to the wastegate actuator in correspondence with periodic fluctuation of the pressure differential; and
for a second range of engine speeds, the second range of engine speeds higher than the first range of engine speeds, applying a non-oscillating holding current to the wastegate actuator, the non-oscillating holding current determined based on the pressure differential.

12. A wastegate control system, comprising:
a controller;
a wastegate actuator operatively coupled to a wastegate valve; and
computer-readable instructions stored in non-transitory memory, the instructions executable by the controller to:
determine a pressure differential across the wastegate valve based on a difference between outputs of a turbocharger turbine inlet pressure sensor and a turbocharger turbine outlet pressure sensor;
determine a holding current to supply to the wastegate actuator based on fluctuations in the pressure differential across the wastegate valve; and
apply the holding current to the wastegate actuator.

13. The wastegate control system of claim 12, wherein the computer-readable instructions further comprise instructions executable by the controller to:
  determine a desired position of the wastegate valve;
  receive an actual position of the wastegate valve from a wastegate position sensor; and
  determine a deviation of the wastegate valve from the desired position based on the desired position and the actual position.

14. The wastegate control system of claim 13, wherein the computer-readable instructions further comprise instructions executable by the controller to correct subsequently determined holding currents based on the deviation.

15. The wastegate control system of claim 12, wherein the computer-readable instructions further comprise instructions executable by the controller to:
  determine engine speed;
  determine an average pressure differential across the wastegate valve and a peak pressure differential across the wastegate valve during a time interval based on the outputs of the turbocharger turbine inlet pressure sensor and the turbocharger turbine outlet pressure sensor during the time interval; and
  determine a weighted average of the average and peak pressure differentials, including adjusting respective weights of the average and peak pressure differentials in the weighted average based on the engine speed,
  wherein the determination of the holding current is further based on the weighted average.

\* \* \* \* \*